(12) United States Patent
Dorrell et al.

(10) Patent No.: US 7,251,343 B2
(45) Date of Patent: Jul. 31, 2007

(54) IMAGE PROTECTION

(75) Inventors: Andrew James Dorrell, East Blaxland (AU); Alan Valev Tonnison, Baulkham Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 10/319,713

(22) Filed: Dec. 16, 2002

(65) Prior Publication Data

US 2003/0123701 A1 Jul. 3, 2003

(30) Foreign Application Priority Data

Dec. 18, 2001 (AU) .................... PR9606

(51) Int. Cl.
*G06K 9/00* (2006.01)

(52) U.S. Cl. ..................... 382/100; 713/176

(58) Field of Classification Search ............... 382/100, 382/232; 713/176; 380/210, 252, 287, 54
See application file for complete search history.

(56) References Cited

U.S. PATENT DOCUMENTS

| | | | | |
|---|---|---|---|---|
| 5,005,200 A | * | 4/1991 | Fischer | 380/30 |
| 5,768,426 A | | 6/1998 | Rhoads | 382/232 |
| 5,809,160 A | | 9/1998 | Powell et al. | 382/100 |
| 6,122,392 A | | 9/2000 | Rhoads | 382/100 |
| 6,411,222 B1 | | 6/2002 | Dorrell | 341/5 D |
| 6,683,966 B1 | * | 1/2004 | Tian et al. | 382/100 |
| 6,961,854 B2 | * | 11/2005 | Serret-Avila et al. | 713/176 |

OTHER PUBLICATIONS

"Secure Spread Spectrum Watermarking For Images, Audio And Video", Ingemar J. Cox et al. , IEEE Int'l. Conf. on Image Processing (ICIP'96), vol. 3, pp. 243-246, 1996.
"A Robust Image Authentication Method Distinguishing JPEG Compression from Malicious Manipulation", Ching-Yung Lin et al., IEEE Trans. on Circuits And Systems For Video Technology, Feb. 2001, pp. 153-168.
JPEG 2000 International Standard Part 1, published as ISO/IEC 15444-1:2000.
MPEG 4 International Standard, published as ISO/IEC 14496:2001.
Ching-Yung Lin et al., "A Robust Image Authentication Method Distinguishing JPEG Compression from Malicious Manipulation", IEEE Transactions on Circuits and Systems of Video Technology, vol. 11, Nos. 2, Feb. 2001; pp. 153-168.

* cited by examiner

*Primary Examiner*—Vikkram Bali
*Assistant Examiner*—Anand Bhatnagar
(74) *Attorney, Agent, or Firm*—Fitzpatrick, Cella, Harper & Scinto

(57) ABSTRACT

A method (100) of marking an image comprising image data and associated metadata, for modification detection, is disclosed. The method (100) encodes the image data to produce encoded image data and hashes the encoded image data to provide a first hash. The first hash is added to the associated metadata to form augmented metadata the associated metadata is hashed to provide a second hash. The second hash is added to the augmented metadata. An association is created between the encoded image data, the first and second hash, and the augmented metadata, thereby marking the image.

18 Claims, 8 Drawing Sheets

IMAGE PROTECTION

TECHNICAL FIELD OF THE INVENTION

The present invention relates generally to digital imaging and, in particular, to embedding supplementary information in a digital image and to the authentication of the embedded supplementary information. The invention also relates to a computer program product including a computer readable medium having recorded thereon a computer program for embedding supplementary information in a digital image and authenticating the embedded supplementary information.

BACKGROUND ART

The need for image protection has been increasing in recent years and as a result at least two forms of image metadata have been growing in importance. These forms of image metadata are firstly, authentication information, which is used to determine whether an image has been altered since acquisition, and secondly, intellectual property rights information (e.g. copyright labelling), which is used to identify the party or parties having intellectual property rights in the image. Conventional techniques for associating these forms of image metadata often have conflicting requirements, which presents several problems when both of these forms of image metadata are to be included in a single image.

As an example, watermarks can be used to embed intellectual property rights information into image data. Such watermarks need to be robust to modification of the watermarked image data through image processing techniques such as scaling, rotation, brightness, contrast adjustments and file format conversions. In contrast, watermarks used for authentication of an image are designed to be fragile to modification, as it is by the absence, or partial absence of these watermarks, that alterations to source image data can be identified. As a consequence of these different requirements, watermarking techniques used for embedding intellectual property rights and for authentication is invariably very different.

Interference between different watermarks and/or added degradation of image quality can occur when different types of watermarks are used together. Therefore, it is generally undesirable to use more than one type of watermark within a single image. However, one known watermarking technique referred to as the Secure Digital Music Initiative (SDMI) has proposed a model that uses a combination of robust and fragile watermarks in source image data. The concept behind SDMI is that the fragile watermark is destroyed in the process of copying the source image data while the robust watermark remains. The SDMI technique is however undesirable when used just for the purpose of authentication. In particular, the use of fragile watermarks can result in modifications to an image that may impact on the compressibility and/or the visual quality of the image. Also, since fragile watermarks are by their very nature fragile, these watermarks can be lost completely if the image is modified making it difficult to provide additional information to a user about the type or extent of modification.

In order to address the above mentioned problems with conventional watermarking techniques, the Joint Photographic Experts Group (JPEG) 2000 and the Moving Picture Experts Group (MPEG) 4 standards, proposed to embed copyright information as metadata in a file wrapper associated with the image data. However, copyright information embedded, as metadata in a file wrapper is potentially open to malicious modification or malicious or accidental removal during processes such as file format conversion.

In addition, copyright information embedded using watermarks is not easily visible to applications software and there is no way of guaranteeing that the watermark was not inserted fraudulently, say after stripping of copyright metadata tags. This is of particular concern in systems, which incorporate automatic billing based on embedded rights information.

SUMMARY OF THE INVENTION

It is an object of the present invention to substantially overcome, or at least ameliorate, one or more disadvantages of existing arrangements.

According to one aspect of the present invention there is provided a method of marking an image comprising image data and associated metadata, for modification detection, said method comprising the steps of:

encoding said image data to produce encoded image data;

hashing said encoded image data to provide a first hash and adding said first hash to said associated metadata to form augmented metadata;

hashing said associated metadata to provide a second hash and adding said second hash to said augmented metadata; and creating an association between said encoded image data, said first and second hash, and said augmented metadata, thereby marking said image.

According to another aspect of the present invention there is provided an apparatus for marking an image comprising image data and associated metadata, for modification detection, said apparatus comprising:

encoding means for encoding said image data to produce encoded image data;

first hashing means for hashing said encoded image data to provide a first hash and adding said first hash to said associated metadata to form augmented metadata;

second hashing means for hashing said associated metadata to provide a second hash and adding said second hash to said augmented metadata; and association means for creating an association between said encoded image data, said first and second hash, and said augmented metadata, thereby marking said image.

According to still another aspect of the present invention there is provided a program including computer implemented program codes for marking an image comprising image data and associated metadata, for modification detection, said program comprising:

code for encoding said image data to produce encoded image data;

code for hashing said encoded image data to provide a first hash and adding said first hash to said associated metadata to form augmented metadata;

code for hashing said associated metadata to provide a second hash and adding said second hash to said augmented metadata; and code for creating an association between said encoded image data, said first and second hash, and said augmented metadata, thereby marking said image.

According to still another aspect of the present invention there is provided a method for authenticating an image, said image comprising image data and metadata, said method comprising the steps of:

determining availability of said associated metadata;

determining if said associated metadata has been modified upon said metadata being available;

determining if said image data has been modified; and authenticating said image in the event that neither said metadata nor said image data have been modified, wherein said associated metadata and said image data are independently authenticated.

According to still another aspect of the present invention there is provided an apparatus for authenticating an image, said image comprising image data and metadata, said apparatus comprising:

means for determining availability of said associated metadata;

means for determining if said associated metadata has been modified upon said metadata being available;

means for determining if said image data has been modified; and means for authenticating said image in the event that neither said metadata nor said image data have been modified, wherein said associated metadata and said image data are independently authenticated.

According to still another aspect of the present invention there is provided a computer program for authenticating an image, said image comprising image data and metadata, said program comprising:

code for determining availability of said associated metadata;

code for determining if said associated metadata has been modified upon said metadata being available;

code for determining if said image data has been modified; and code for authenticating said image in the event that neither said metadata nor said image data have been modified, wherein said associated metadata and said image data are independently authenticated.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
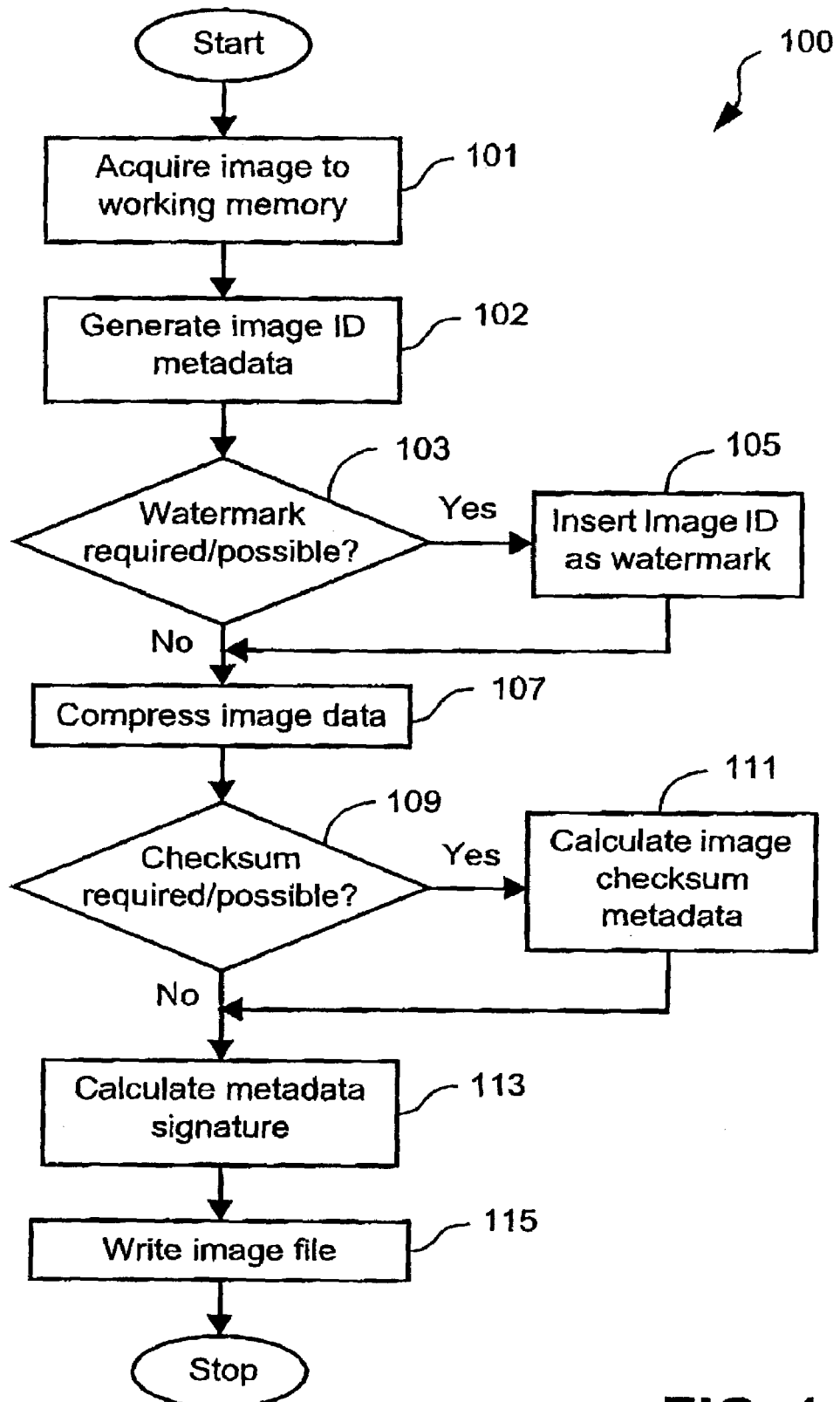
FIG. 1 is a flow diagram showing a method of marking an image.

Where reference is made in any one or more of the accompanying drawings to steps and/or features, which have the same reference numerals, those steps and/or features have for the purposes of this description the same function(s) or operation(s), unless the contrary intention appears.

Figure 2:
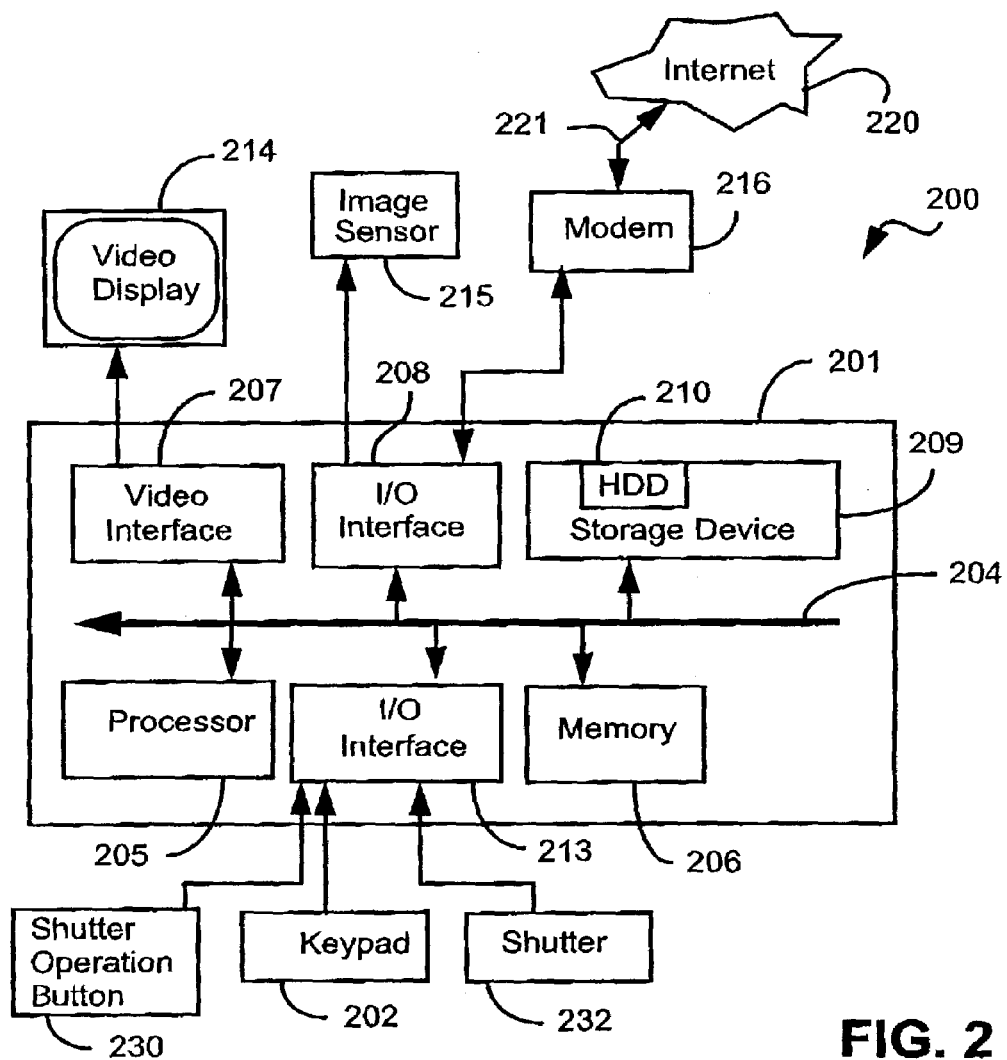
FIG. 2 is a schematic block diagram of a digital camera upon which arrangements described can be practiced.

A method 100 of marking an image for combined copyright and modification detection is described below with reference to FIG. 1. The method 100 is preferably performed in conjunction with the acquisition of image data, representing the image, by a digital still image camera 200 as shown in FIG. 2. The method 100 of FIG. 1 may be implemented as software, such as an application program executing within an on-board computer module 201 of the still image camera 200. In particular, the steps of the method 100 of marking an image are effected by instructions in the software that are carried out by the on-board computer module 201. The instructions may be formed as one or more code modules, each for performing one or more particular tasks. The software may also be divided into two separate parts, in which a first part performs the method of marking an image and a second part manages a user interface between the first part and the user. The software may be stored in a computer readable medium, including the storage devices described below, for example. The software can be loaded into the computer from the computer readable medium, and then executed by the computer. A computer readable medium having such software or computer program recorded on it is a computer program product.

As seen in FIG. 2, the camera 200 comprises an on-board computer module 201, input devices such as an image sensor 215 (e.g. a charge coupled device), a keypad 202 and a shutter operation button 230, and output devices including a display device 214 and shutter 232. Optionally, a Modulator-Demodulator (Modem) transceiver device 216 can be used by the on-board computer module 201 for communicating to and from a communications network 220, for example connectable via a telephone line 221 or other functional medium. The modem 216 can be used to obtain access to the Internet, and other network systems, such as a Local Area Network (LAN) or a Wide Area Network (WAN).

The on-board computer module 201 typically includes at least one processor unit 205, a memory unit 206, for example formed from semiconductor random access memory (RAM) and read only memory (ROM), input/output (I/O) interfaces including an I/O interface 213 for the keypad 202, a display interface 207 for the display 214 and optionally an interface 208 for the image sensor 215 and modern 216. The on-board computer module 201 typically includes a hard disk drive 210. The components 205 to 213 of the computer module 201, typically communicate via an interconnected bus 204 and in a manner which results in a conventional mode of operation of the on-board computer module 201 and camera 200 known to those in the relevant art.

Typically, the application program is resident on the hard disk drive 210 and read and controlled in its execution by the processor 205. Intermediate storage of the program and any data fetched from the network 220 may be accomplished using the semiconductor memory 206, possibly in concert with the hard disk drive 210. In some instances, the application program may be read by the user from the network 220 via the modem device 216. Still further, the software can also be loaded into the camera 200 from other computer readable media such as a CD-ROM or floppy disk. The term "computer readable medium" as used herein refers to any storage or transmission medium that participates in providing instructions and/or data to the on-board computer module 201 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of transmission media include radio or infra-red transmission channels as well as a network connection to another computer or networked device, and the Internet or Intranets including e-mail transmissions and information recorded on websites and the like.

Figure 9:
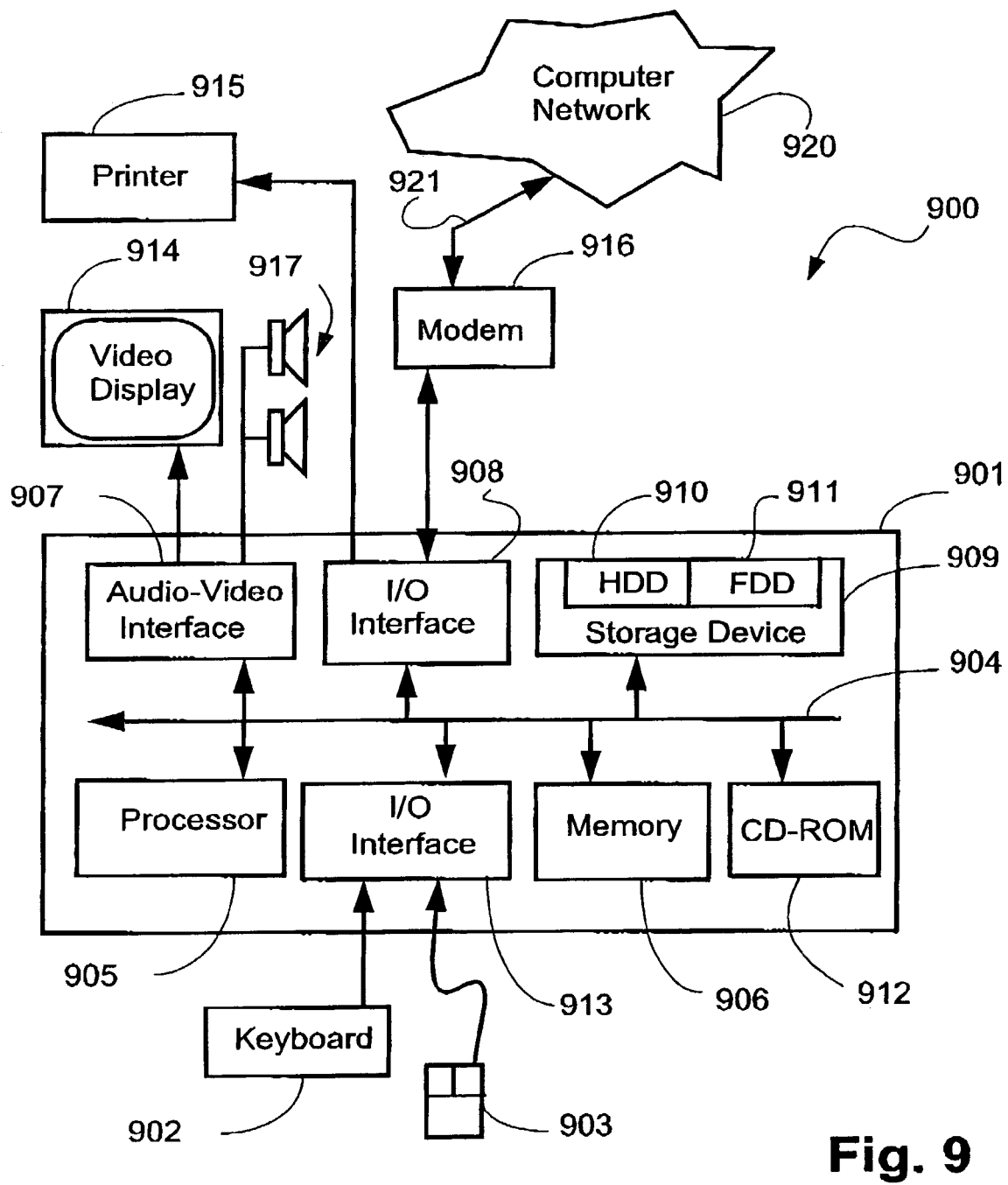
FIG. 9 is a schematic block diagram of a general purpose computer upon which arrangements described can be practiced.

The method 100 of marking an image may alternatively be performed on audio and or video media or combined still image data and audio data captured by a video or combined still and motion sequence camera (not shown). Additionally, the method 100 can be performed on image data acquired by other non-camera means such as a scanner or scanning device within a computer peripheral or stand-alone piece of equipment such as a photocopier, facsimile machine or a combined printer, facsimile, scanner, for example. In this instance, the method 100 can be implemented as an application program executing within a remote computer, for example, a general-purpose computer system 900 as shown in FIG. 9 and as described below. In this instance, the application program can be stored in a hard disk drive 910 of the computer 900 and can be controlled in its execution by a processor 905 of the computer 900.

The method 100 begins at step 101 where image data is captured by the image sensor 215 in conjunction with the processor 205, and the image data is stored in memory 206. Also at step 101, acquisition metadata can be generated by the processor 205 and stored in memory 206 as a metadata block associated with the image data using a metadata binding, for example. The acquisition metadata can include, for example, intellectual property rights information (e.g. copyright labelling), which is used to identify the party or parties having intellectual property rights in the image. The acquisition metadata can also include a date, time, flash status and/or focus settings. A person skilled in the relevant art would appreciate that there are many other forms of metadata, which can be generated at step 101. At the next step 102, identifier metadata is generated, by the processor 205, for the image data. The generation of the identifier metadata at step 102 will be described below with reference to FIG. 3. The method 100 continues at the next step 103, where if the processor 205 determines that watermarking is required for the captured image data then the method 100 proceeds to step 105. Otherwise, the method 100 proceeds to step 107.

Watermark insertion is preferably enabled or disabled by a user-controlled camera setting, which is selected or de-selected using the keypad 202 or other dedicated camera button (not shown). An additional user setting indicating that watermarking should be performed may be overridden at capture time if the camera 200 does not have the computational or memory resources available. This situation may be equivalent to or arise due to a motion sequence being acquired or if the camera 200 is in the process of acquiring multiple high resolution frames in quick succession. In one implementation, watermarking is only performed upon a user releasing the shutter operation button 230 on the camera 200.

At step 105, the image identifier metadata is written to the captured image data stored in memory 206, using a watermarking or similar steganographic encoding technique. Any suitable watermarking or steganographic technique able to withstand subsequent compression stages performed during the method 100, can be used in the method 100. The watermarking technique used at step 105 is preferably also able to encode, substantially invisible to the human eye, at least the number of bits required to express the image identifier metadata along with any support information required such as check digits or error correction codes.

The method 100 continues at the next step 107, where the image data captured at step 101 is compressed, by the processor 205, and stored in memory 206 or the hard disk drive 210. Alternatively, the image data can be compressed by dedicated hardware such as one or more integrated circuits performing the compression at step 101. Such dedicated hardware can be implemented as an embedded system of a scanner or scanning device within a computer peripheral or stand-alone piece of equipment such as a photocopier, facsimile machine or a combined printer, facsimile, scanner, for example. The JPEG compression standard is preferably used to compress the image data. However, any other compression scheme including lossless compression schemes such as Lempel-Ziv-Welch (LZW) and Portable Network Graphics (PNG), or lossy compression schemes such as JPEG2000, can be used at step 107. The compression scheme chosen however must not corrupt or destroy the watermark inserted at step 105. At the next step 109, the processor 205 determines whether authentication data is to be inserted into the captured image data. The authentication data is inserted into the image data as a further metadata block associated with the compressed image data and can be added to any other metadata (e.g. the acquisition metadata block) that was previously associated with the image data. The result of step 109 is preferably determined by the state of a user adjustable camera setting, which can be changed by a user utilising the keypad 202. For example, a flag stored in the memory 206 of the camera 200 may be set by a user utilising the keypad 202 in order to indicate whether authentication data is to be inserted into the captured image data.

If step 109 returns true, indicating that authentication data is required, then the method 100 proceeds to step 111. At step 111, the compressed image data stored in the memory 206 or hard disk drive 210 is processed to generate authentication data in the form of a checksum which is added to the metadata block associated with the image data. Otherwise, the method 100 proceeds to step 113. The checksum is preferably generated by the processor 205, at step 111, using the Secure Hash Algorithm (SHA-1). However, other algorithms may be used depending on a predetermined time-security trade-off chosen by a user. For example, if a low security/high speed implementation is required, then a Cyclic Redundancy Checksum (CRC) may be used at step 111. Alternatively, if a high security/low speed implementation is preferred then a memory data (e.g. SHA-1, MD5) checksum may be used.

At the next step 113, the processor 205 digitally signs the metadata block, associated with the compressed image data, containing the checksum. The preferred signing process is the Digital Signature Standard (DSS) which uses the SHA-1 hash algorithm and encrypts the result. However, in a low security implementation, such as the one mentioned previously which uses a cyclic redundancy checksum for the image checksum, it is not necessary to use such a secure signature standard.

The method 100 concludes at the next step 115, where the compressed image data and the associated metadata block are written to a file, and stored in memory 206 or the hard disk drive 210, for example, using the EXIF Image Format file specification. However, any other suitable image file format can be used for step 115. Where the file format permits, the metadata signature preferably appears earliest in the image file written at step 115, followed by the metadata block containing the image checksum and finally the image data itself.

Alternatively, in a further advantageous implementation of the method 100, steps 111 and 113 can be combined such that a combined image and metadata signature is determined for the image data acquired at step 101. The combined image and metadata signature and the compressed image data can be written to a file and stored in memory 206. Again, the SHA-1 hash algorithm, for example, can be used to determine the combined image and metadata signature.

In a further advantageous implementation of the method 100, steps 111 and 113 or a combined step 111 and 113 can be followed by a step where a further image and metadata signature can be determined for the previously determined image and metadata signature. Again, the SHA-1 hash algorithm, for example, can be used to determine this further image and metadata signature.

Figure 3:
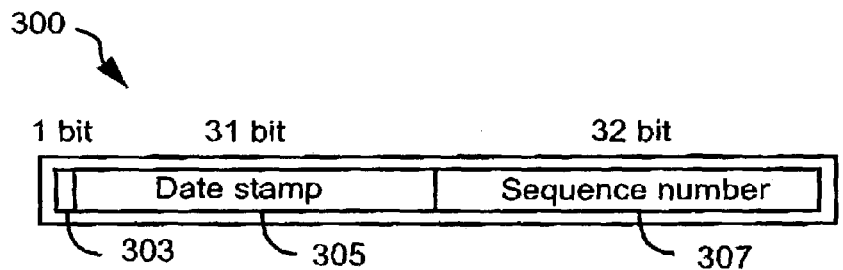
FIG. 3 shows the data structure of an image identifier used in the method of FIG. 1.

FIG. 3 shows the data structure of an image identifier 300, which can be used in the method 100. The image identifier comprises a data word 300 where the most significant bit 303 indicates the presence of authentication information in the metadata block associated with the image. The word 300 is 64 bits long. However, those skilled in the image coding arts would appreciate that the word 300 can contain any number of bits. The word 300 also comprises a date-stamp field 305 which is preferably thirty-one bits long and contains an American National Standards Institute (ANSI) calendar date expressed as the number of seconds since 1 Jan. 1970, Universal Time Clock (UTC). The next field 307 of the word 300 contains a sequence number and is preferably thirty-one bits long. The value of the sequence number field 307 is read from a non-volatile register (not shown) in the hard disk drive 210 of the digital camera 200, where the register is incremented, for example, by modulo (2^(32)) with each photo taken.

The time 305 and sequence 307 fields provide a relatively unique identifier for an image whilst still providing an immutable embedding of metadata representing the capture date and time. However, those skilled in the image coding arts would appreciate that any concatenation of metadata fields could be used to form the image identifier 300. For example, any label identifying the digital camera 200 (e.g. manufacturer, model or the underlying technology), as well as acquisition parameters that may be taken into account in later rendering of the image such as flash status, focus settings or an enumeration of an automatic mode such as "action", "portrait", "landscape", or "macro".

Further, where a number of cameras 200 are contributing to a shared pool of images, possibly covering common public or private events, the sequence number field 307 can be initialised to different values or incremented according to different rules, The sequence number provides causality as well as an added degree of uniqueness to the image identifier 300 so that any predictable sequence, including pseudo-random sequences, can be used as the sequence number 307 providing that the matching sequence can be reproduced as required.

Figure 8:
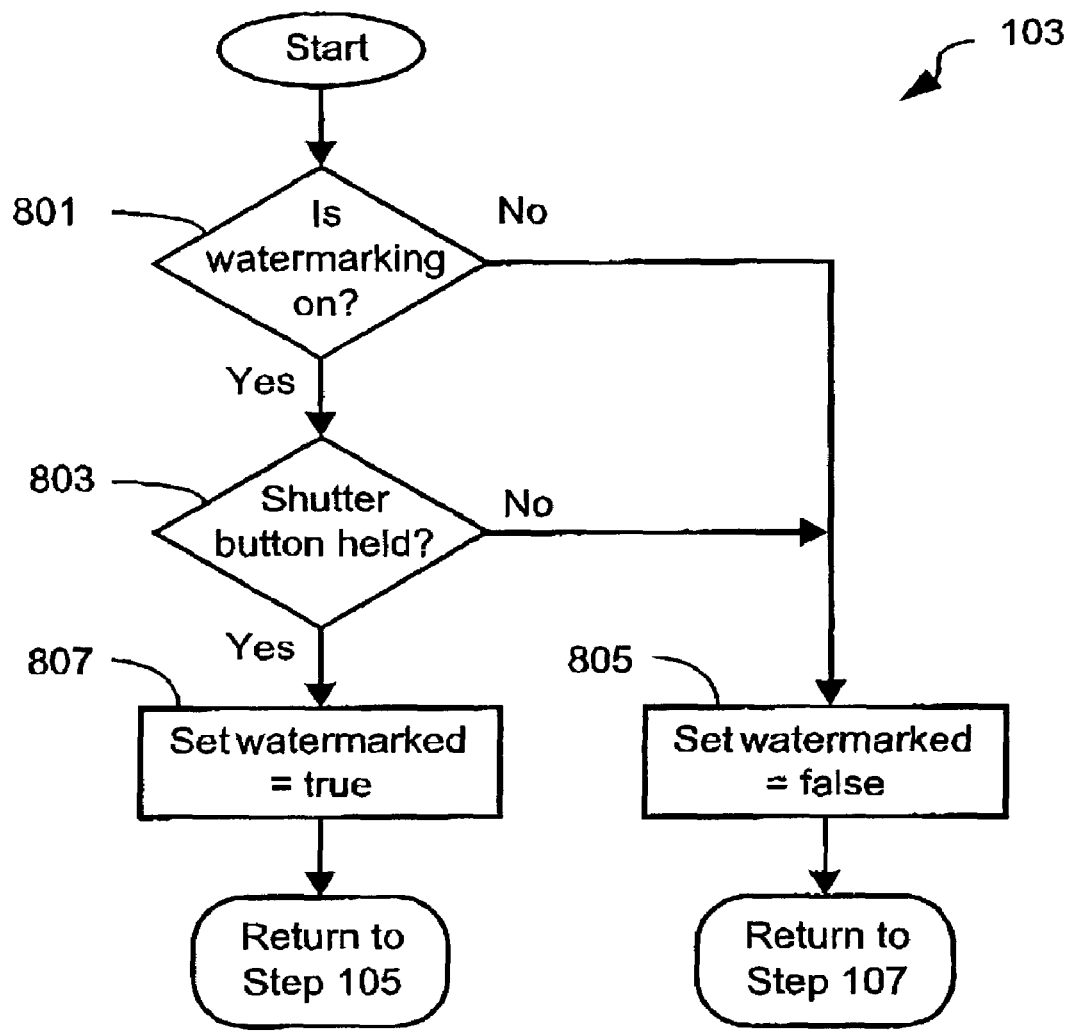
FIG. 8 is a flow diagram showing a method of determining whether to insert a watermark into an image.

FIG. 8 is a flow diagram showing the process of determining whether to insert a watermark into an image, as performed at step 103 of the method 100. Step 103 essentially determines whether the camera 200 is acquiring a single image or a multiple image sequence. An application program configured to perform the sub-steps of step 103 is preferably resident on the hard disk drive 210 and read and controlled in its execution by the processor 205. Step 103 is preferably implemented in the camera 200 using the shutter operation button 230 where multi-frame acquisition is associated with the user pressing and holding the shutter operation button 230. However, those skilled in the relevant art would appreciate that any suitable method can be used to determine whether to insert a watermark into an image.

In addition, the determination of whether to insert a watermark into an image or not can be dependent on internal constraints of the acquisition hardware (e.g. the digital camera 200) such as the availability of memory 206 and processing resources for watermarking in the presence of time critical acquisition processing. The camera 200 can be configured to override a user setting to insert a watermark into image data, in order to fulfil a higher priority user request such as a multi-frame acquisition.

The process of step 103 begins at sub-step 801, where if the user has depressed the shutter operation button 230 and if the watermarking feature has been selected in pre-selected user settings of the camera 200, then the process of step 103 proceeds to sub-step 803. Otherwise, the process proceeds to sub-step 805. At sub-step 803, if the shutter operation button 230 has been released or if multi-frame mode has been disabled, then the process of step 103 proceeds to sub-step 805. At sub-step 805, an internal "watermarked" flag stored in memory 206 is set to "false" and the process returns to step 107 of the method 100.

If the shutter operation button 230 has been held, at step sub-803, and there is no multi-frame acquisition in progress, the "watermarked" flag is set to true at sub-step 807 and the process returns to step 105, where the image identifier is written to the captured image stored in memory 206.

The camera 200 has a particular private key associated with it for exclusively signing image data of a captured image as at step 113. The private key can be used to sign the image data and the image metadata and can be embedded in the hard disk 210 of the camera 200. The private key provides a high degree of certainty regarding the authenticity of an image captured by the camera 200 and is useful where claims regarding ownership of an image are being made or an image is being tendered as evidence. The security of the signature provided by the camera 200 is dependent on the security of the private key associated with the camera 200 as anyone in possession of the private key can hash and sign image data to make the image data appear that it originated from the camera 200 directly.

In order to secure the private key associated with the camera 200, the private key can be embedded in the hard disk drive 210 or memory 206 in a non-volatile form, during manufacture. The hard disk drive 210 or memory 206 in which the private key is stored is not accessible without significant disassembling of the camera 200, thus providing a user with secure management of the private key. The private key can be generated by the camera 200 based on user input via the keypad 202. Alternatively, the private key can be down-loaded into the camera 200 from the network 220. In this case, the user is responsible for maintaining the security of the private key. The authentication can only be trusted as much the owner of the private key since the owner is the authority that makes the claim as to the authenticity of the signed data.

In one implementation, the private key is embedded within a chip (e.g. the processor 205) that performs the hashing and signing of image data. In this case, signing of image data would be carried out by hardware as opposed to firmware, and the private key would never appear on the interconnected bus 204.

Other forms of authentication data are possible for determining the authenticity of the image data. For example, an array of hashes or checksums for each row or block of image data can be used. Further, any form of authentication data which is robust to the modifications that occur during re-compression of the image data but which remain fragile to alterations of the visual content. For example, the authentication signature described by Ching-Yung Lin and Shih-Fu Chang, in the publication entitled "A Robust Image Authentication Method Distinguishing JPEG Compression from Malicious Manipulation", published in the "IEEE Transactions on Circuits and Systems for Video Technology", Volume 11, February 2001. The authentication signature described by Lin et al, is based on the invariance of the relationship between discrete cosine transform (DCT) coefficients at the same position in separate blocks of an image. These relationships are preserved when DCT coefficients are quantised in JPEG compression. Such an authentication signature provides information about the nature and extent of modification made to image data at the expense of increased storage overhead.

Figure 4:
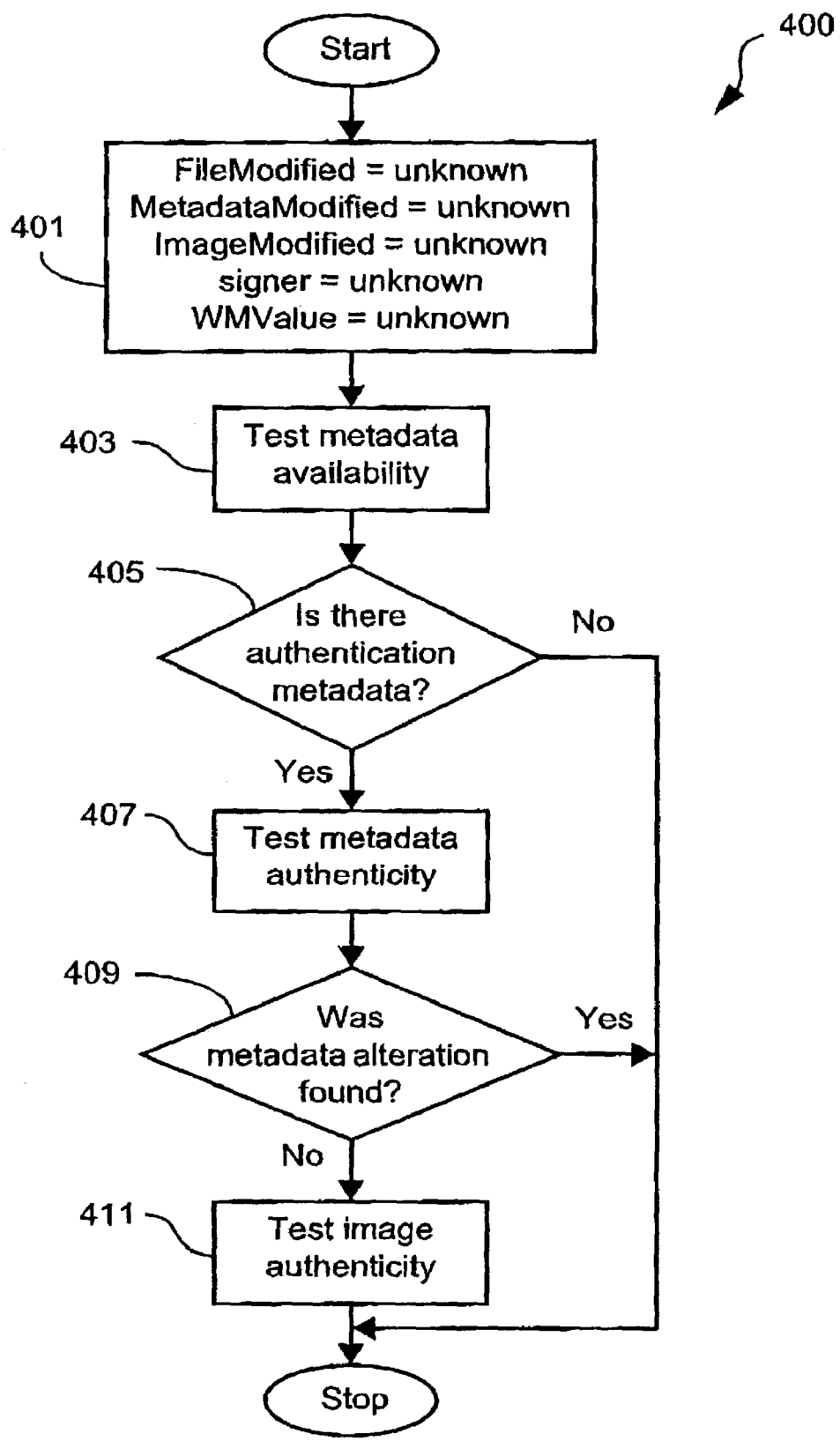
FIG. 4 is a flow diagram showing a method of authenticating an image.

FIG. 4 is a flow diagram showing a method 400 of authenticating an image file, which has been marked in accordance with the method 100. The image file is stored in the hard disk drive 210. The method is implemented as software, such as an application program executing within the on-board computer module 201 of the still image camera 200 and being stored in hard disk drive 210. Again, the method 400 can be implemented as an application program executing within the computer system 900 and being stored on the hard disk drive 910. The method 400 begins at step 401, where a set of variables reflecting the authentication state of the image file are initialised to the value "unknown". The set of state variables are associated with the image file stored in the hard disk drive 210 and include the following:

(i) FileModified—indicates whether the image file has been modified;

(ii) MetadataModified—indicates whether the metadata block associated with the image file has been modified;

(iii) ImageModified—indicates whether the image data of the image file has been modified (e.g. rotated, scaled, cropped);

(iv) Signer—a value associated with the camera 200 or other image capture device; and (v) WMvalue—indicates that the image file contains a watermark.

At the next step 403, authentication metadata associated with the image file is accessed from hard disk drive 210 and tested for availability. The processor determines metadata availability based on the condition of the WMvalue state variable as will be described in further detail below with reference to FIGS. 5 and 6. Then at step 405, if the authentication metadata associated with the image file was successfully accessed, the method 400 proceeds to step 407. Otherwise the method 400 concludes. At step 407, the authenticity of the authentication metadata is verified by the processor 205. The authenticity of the authentication metadata is verified using signature values associated with the metadata as will be described in detail below with reference to FIG. 7(a).

The method 400 continues at step 409, where if the authentication metadata has been altered then the method 400 concludes. The determination of whether or not the authentication metadata has been altered is made based on the condition of the MetadataModified state variable as will be explained in detail below. Otherwise the method 400 continues at the next step 411, where the authenticity of the image data associated with the image file is tested by the processor 205 and the process concludes. The processor 205 determines whether the image has been modified at step 411 based on the condition of the ImageModified state variable as will be described in detail below with reference to FIG. 7(b).

Figure 5:
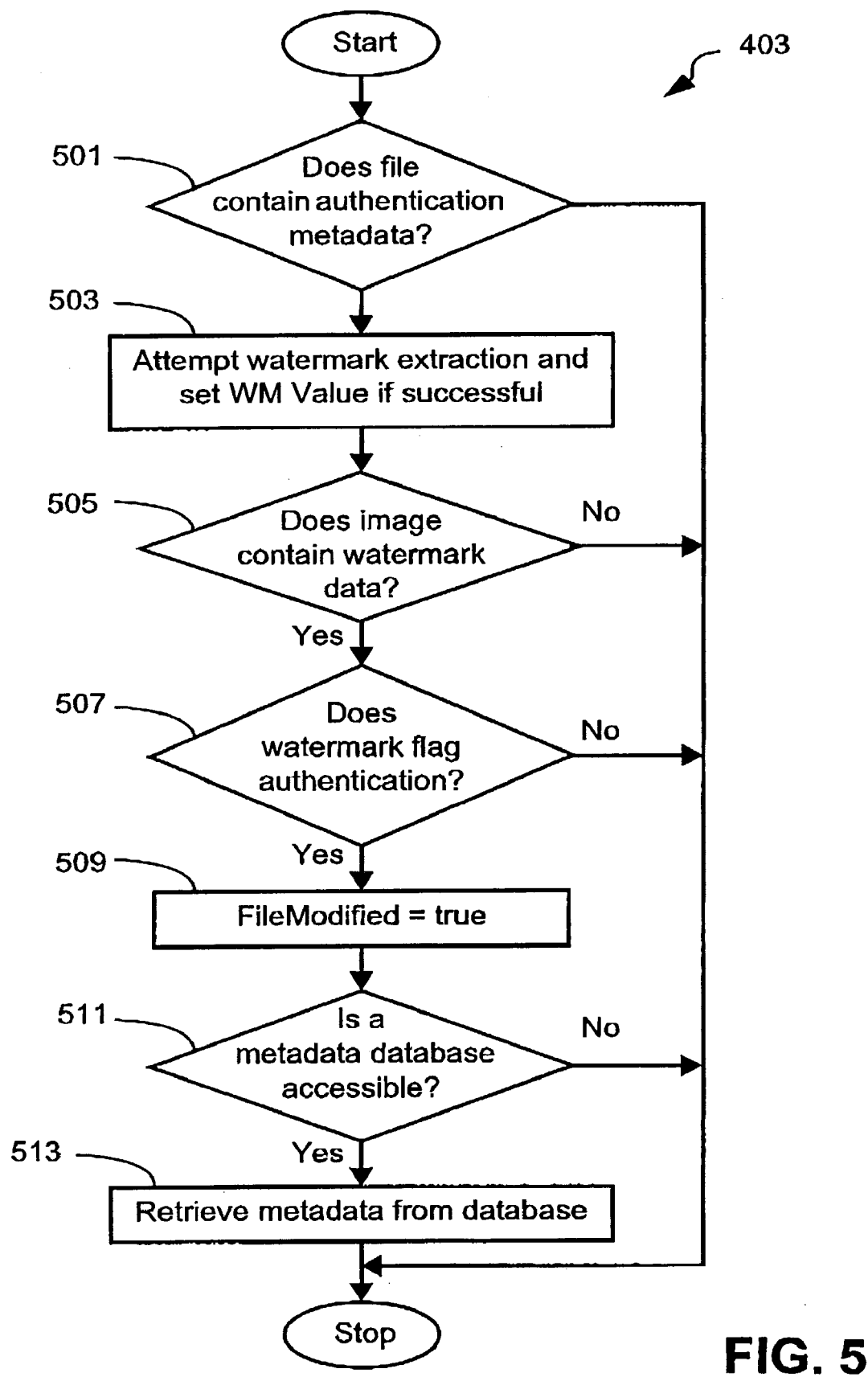
FIG. 5 is a flow diagram showing a method of testing for metadata availability.

FIG. 5 is a flow diagram showing the process of step 403. The process of step 403 is implemented as software, such as an application program executed by the processor 205 of the still image camera 200 and being stored in the hard disk drive 210. Again, the method 500 can be implemented as an application program executing within the computer system 900 and being stored on the hard disk drive 910. The process begins at sub-step 501, where if the image file stored in memory 206 contains authentication metadata then the process of step 403 concludes. Otherwise, if no authentication metadata is found, then the subsequent sub-steps of step 403 determine whether the authentication metadata has been removed or lost in some way and whether the authentication metadata is recoverable. At sub-step 503, an attempt is made to extract watermark data from the image file and if the image file contains a watermark then the variable, WMValue, is set. At the next sub-step 505, if the processor 205 determines that no watermark data can successfully be extracted from the image data then a dissociation of the metadata from the image data is performed by the processor 205 and the process of step 403 concludes. If however, watermark data was able to be recovered from the image data at sub-step 505 then the process proceeds to sub-step 507 where a test is performed by the processor 205 to determine, from the recovered watermark data whether, at the time of watermarking, authentication metadata was written to the image file. At sub-step 507, if authentication metadata was originally written to the image file then the state of the "fileModified" authentication state variable is set to true at the next sub-step 509. Otherwise, the process of step 403 concludes. Based on the identifier metadata contained in the watermark, the original metadata for the image data, which includes authentication metadata, may be recovered from a metadata database stored on the hard disk drive 210. The presence and or accessibility of such a database is tested for at the next sub-step 511. If no authentication metadata can be recovered from such a database, at sub-step 511, then the process of step 403 concludes. If such a database is available at sub-step 511, then the metadata is retrieved from the database at the next sub-step 513 and the process of step 403 concludes.

One advantage of the process of step 403 as described above with reference to FIG. 5 is that watermark data is not decoded unless it is required for the purpose of verifying the absence of authentication metadata. This is particularly advantageous in an implementation where performance is important.

Figure 6:
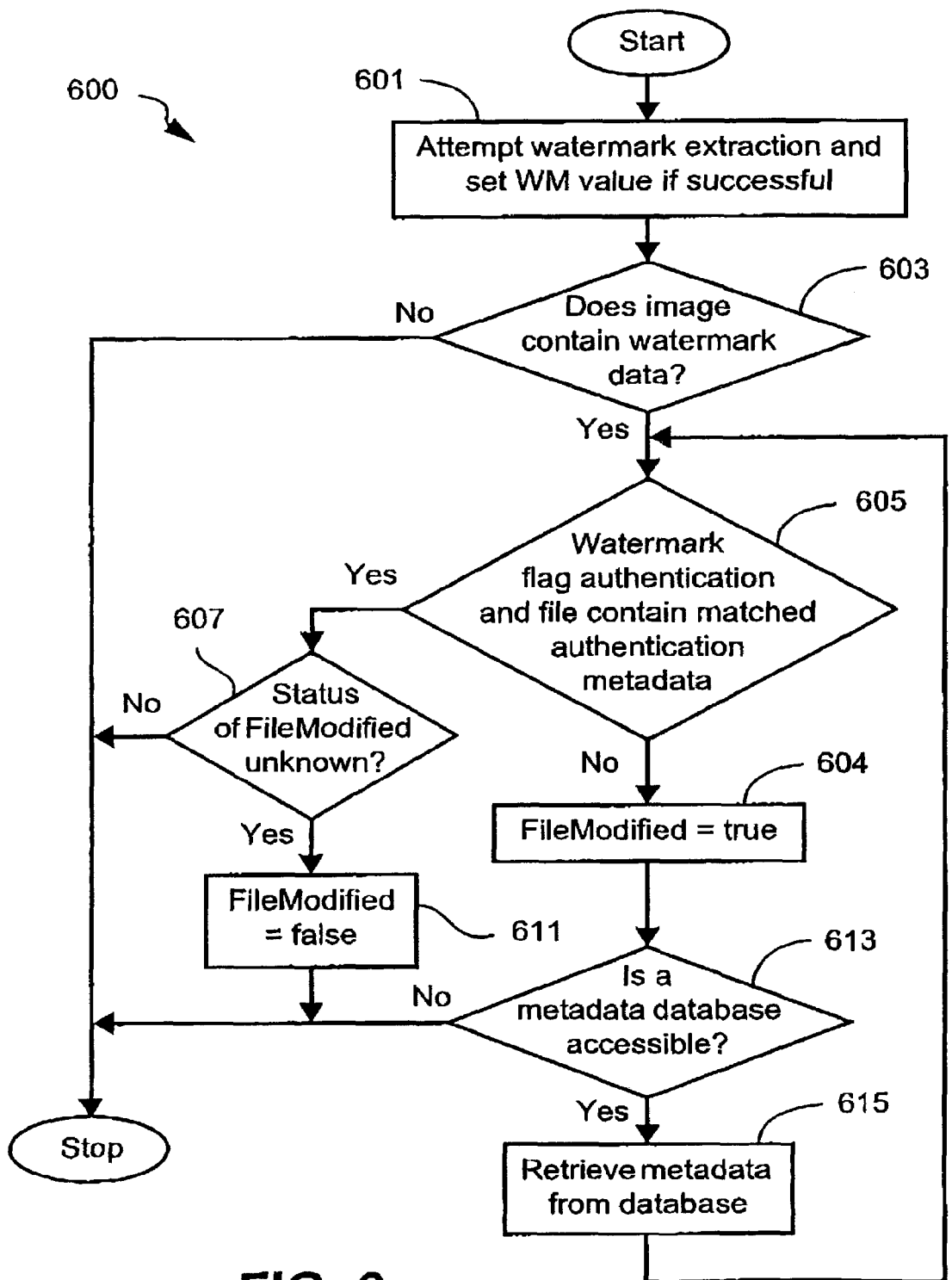
FIG. 6 is a flow diagram showing a method of testing for metadata availability and for determining the origin of the metadata.

In accordance with a further advantageous implementation, the process of step 403 can be configured to detect whether metadata from a different image file has been substituted or whether forged metadata has been inserted into the image file stored in the hard disk drive 210. However, such additional verification requires that the watermark data associated with an image file be decoded for every authentication. FIG. 6 shows a method 600 of testing for metadata availability and for determining the origin of the metadata associated with an image file stored on the hard disk drive 210. Again, the method 600 can be implemented as an application program executing within the computer system 900 and being stored on the hard disk drive 910. The method 600 is implemented as software, such as an application program executed by the processor 205 of the still image camera 200 and being stored on the hard disk 210 The method 600 begins at step 601, where the processor 205 attempts to extract watermark data from the image file and if the image file contains a watermark then the variable, WMValue, is set. At the next step 603, if the processor 205 determines that no watermark data can successfully be extracted from the image file then a dissociation of the metadata from the image data of the image file is performed by the processor 205 and the method 600 concludes. If however, the processor 205 determines that watermark data can be recovered from the image file at step 603 then the method 600 proceeds to step 605 where a test is performed to determine the legitimacy of a metadata binding associated with the image file. This test involves two determinations. Firstly, a determination is made as to whether or not authentication metadata is associated with the watermark present in the image file. Secondly, a determination is made as to whether the identifier encoded in the watermark matches the identifier contained in the metadata. If the metadata binding present in the image file is legitimate then the status of the "FileModified" authentication state variable is tested at step 607. Otherwise, the method 600 proceeds to step 604, where the value of the "FileModified" state variable is set to "true". In this case it may be possible, based on the identifier data contained in the watermark, that the original metadata for the image data of the image file, which includes authentication metadata, can be recovered from a metadata database. Such a metadata database can be stored on the hard disk drive 210. Alternatively, the metadata database can be stored on a remote computer such as the computer 900 and accessed via the network 220. Still further, in the instance where the methods 400 to 800 are being implemented on a computer such as the computer 900, the metadata database can be stored in the hard disk drive 910 or on the hard disk drive (not shown) of a further remote computer accessed via the network 220. The presence and or accessibility of such a database is tested for at the next step 613. If the processor 205 determines that authentication metadata cannot be recovered, at step 613, then the method 600 concludes. However, if a database is accessible at step 613 then the authentication metadata is retrieved from the database at the next step 615 prior to the method 600 returning to step 605.

If the state of the "FileModified" authentication state variable is "unknown" at step 607 then the variable is set to "false" at the next step 611 and the method 600 concludes. If the state of the FileModified variable has already been set, at step 607, then the method 600 concludes without the state of the variable being altered.

In accordance with a still further advantageous implementation, steps 613 and 615 of the method 600 (i.e. testing for and retrieving backup copies of the metadata block stored with the image file) can be incorporated into the decision block of step 605. In this manner the stored metadata can always be validated against the original metadata stored in a backup database. Although, this still further implementation is thorough, it is inefficient, especially for large databases of images.

Figure 7A:
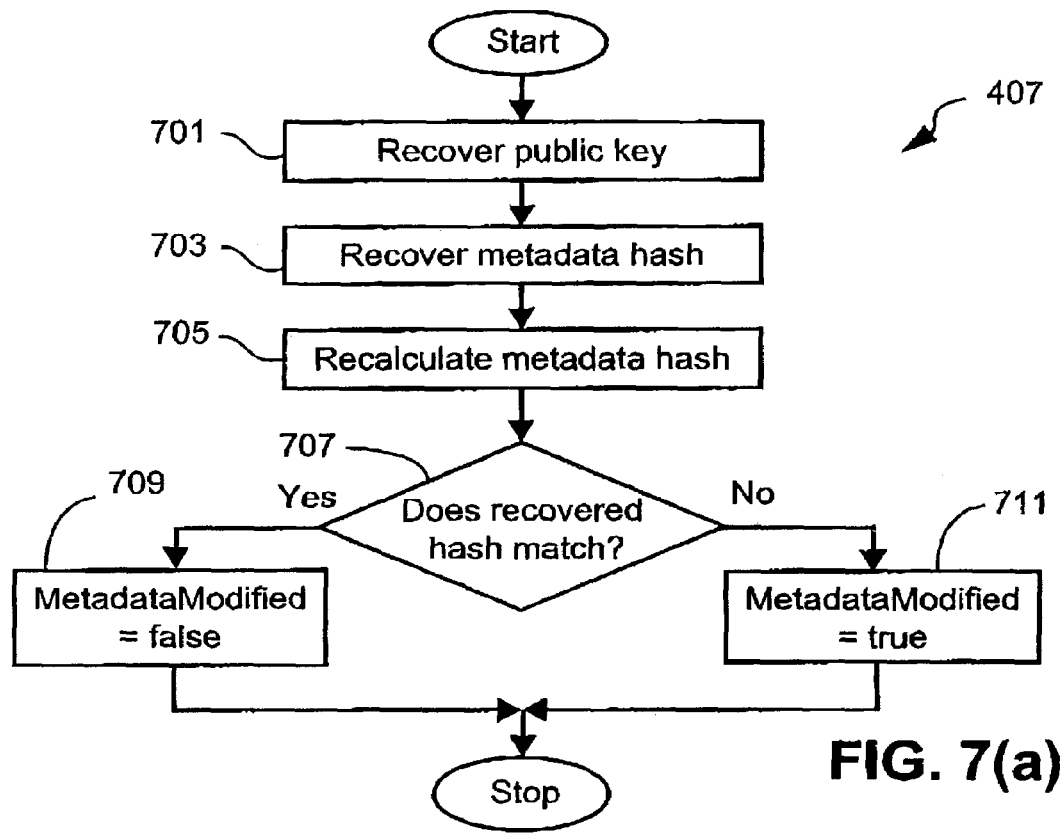
FIG. 7(a) is a flow diagram showing a method of authenticating metadata using signature values.

The steps of authenticating the metadata using signature values as performed at step 407, is shown in FIG. 7(a). The process of step 407 is implemented as software, such as an application program executed by the processor 205 of the still image camera 200 and being stored on the hard disk drive 210. The process begins at sub-step 701, where a public key, corresponding to the private key associated with the camera 200, required for testing the metadata signing is accessed by the processor 205. The public key can be accessed using any one of many known methods. For example, the public key can be received from a trusted party or from the user's key ring. At the next sub-step 703, the metadata block associated with the stored image file is accessed by decrypting the identifier associated with the metadata block using the public key. The result of decrypting the identifier is a hash, which can be compared to another hash calculated for the metadata block. The process of step 407 continues at the next sub-step 705 where the hash of the metadata block is calculated by the processor 205. At the next sub-step 707, the processor 205 compares the calculated hash with the decrypted hash. If the hash calculated at sub-step 705 matches the hash decrypted from the identifier metadata then the value of the "MetadataModified" authentication state variable is set to "false" at the next sub-step 709 before the process of step 407 concludes. Otherwise, if the hash calculated at sub-step 705 does not match the hash decrypted from the identifier then the value of the "MetadataModified" authentication state variable is set to "true" at the next sub-step 711 before the process of step 407 concludes.

Figure 7B:
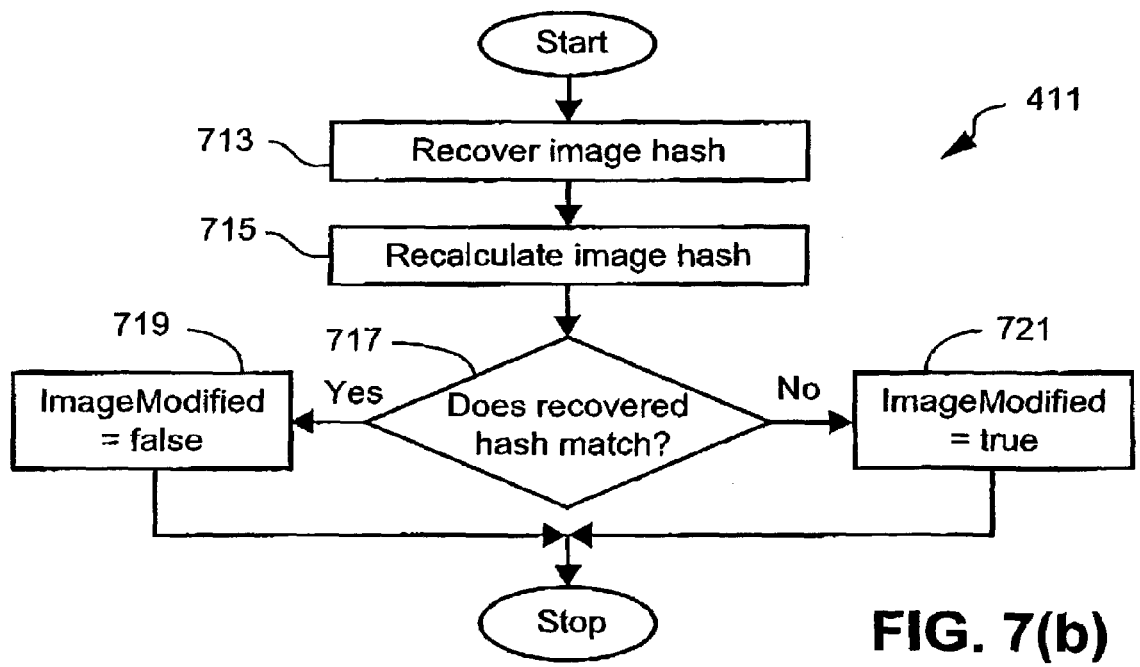
FIG. 7(b) is a flow diagram showing a method of verifying image data using a hash or checksum stored in authentication metadata.

The steps of verifying the image data against the hash or checksum stored in the authentication metadata, as performed at step 411, is shown in FIG. 7(b). The process of step 411 is implemented as software, such as an application program executed by the processor 205 of the still image camera 200 and being stored in hard disk drive 210. Again, the method 700 can be implemented as an application program executing within the computer system 900 and being stored on the hard disk drive 910. The process of step 411 begins at sub-step 713, where the processor 205 reads the image hash from the authentication metadata associated with the image file. At the next sub-step 715, a hash of the image data is calculated. The process of step 411 continues at the next sub-step 717, where the processor 205 compares the image hash associated with the authentication metadata with the hash calculated at sub-step 715. If the processor 205 determines that the calculated hash matches the hash from the authentication metadata then the value of the "ImageModified" authentication state variable is set to "false" at the next sub-step 719 before the process of step 411 concludes. Otherwise, if the calculated hash does not match the hash from the authentication metadata then the value of the "ImageModified" authentication state variable is set to "true" at the next sub-step 721 before the process of step 411 concludes.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

The methods described above, and, in particular, the methods 100, 400, 500, 600, 700 and 800 can be practiced using a general-purpose computer system 900, such as that shown in FIG. 9 wherein the processes of FIGS. 4 to 8 may be implemented as software, such as an application program executing within the computer system 900. In particular, the steps of the described methods are effected by instructions in the software that are carried out by the computer. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the described methods.

The computer system 900 is formed by a computer module 901, input devices such as a keyboard 902 and mouse 903, output devices including a printer 915, a display device 914 and loudspeakers 917. A Modulator-Demodulator (Modem) transceiver device 916 is used by the computer module 901 for communicating to and from a communications network 920, for example connectable via a telephone line 921 or other functional medium. The modem 916 can be used to obtain access to the Internet, and other network systems, such as a Local Area Network (LAN) or a Wide Area Network (WAN), and may be incorporated into the computer module 901 in some implementations.

The computer module 901 typically includes at least one processor unit 905, and a memory unit 906, for example formed from semiconductor random access memory (RAM) and read only memory (ROM). The module 901 also includes an number of input/output (I/O) interfaces including an audio-video interface 907 that couples to the video display 914 and loudspeakers 917, an I/O interface 913 for the keyboard 902 and mouse 903 and optionally a joystick (not illustrated), and an interface 908 for the modem 916 and printer 915. In some implementations, the modem 9116 may be incorporated within the computer module 901, for example within the interface 908. A storage device 909 is provided and typically includes a hard disk drive 910 and a floppy disk drive 911. A magnetic tape drive (not illustrated) may also be used. A CD-ROM drive 912 is typically provided as a non-volatile source of data. The components 905 to 913 of the computer module 901, typically communicate via an interconnected bus 904 and in a manner which results in a conventional mode of operation of the computer system 900 known to those in the relevant art. Examples of computers on which the described arrangements can be practised include IBM-PC's and compatibles, Sun Sparcstations or alike computer systems evolved therefrom.

Typically, the application program is resident on the hard disk drive 910 and read and controlled in its execution by the processor 905. Intermediate storage of the program and any data fetched from the network 920 may be accomplished using the semiconductor memory 906, possibly in concert with the hard disk drive 910. In some instances, the application program may be supplied to the user encoded on a CD-ROM or floppy disk and read via the corresponding drive 912 or 911, or alternatively may be read by the user from the network 920 via the modem device 916. Still further, the software can also be loaded into the computer system 900 from other computer readable media. The term "computer readable medium" as used herein refers to any storage or transmission medium that participates in providing instructions and/or data to the computer system 900 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 901. Examples of transmission media include radio or infra-red transmission channels as well as a network connection to another computer or networked device, and the Internet or Intranets including e-mail transmissions and information recorded on Websites and the like.

The foregoing describes only some embodiments of the present invention, and modifications and/or changes can be made thereto without departing from the scope and spirit of the invention, the embodiments being illustrative and not restrictive.

The claims defining the invention are as follows:

1. A method of marking image data representing an image for use in modification detection, said method comprising the steps of:
    encoding said image data to produce encoded image data;
    hashing said encoded image data to provide a first hash;
    adding said first hash to a block of metadata representing at least one parameter associated with acquisition of said image data, to form an augmented block of metadata;
    hashing said augmented metadata block to provide a second hash;
    adding said second hash to said augmented metadata block; and
    creating an association between said encoded image data and said augmented metadata block, thereby marking said image.

2. The method according to claim 1, wherein said association is formed by including at least said encoded image data and said augmented metadata block in a file.

3. The method according to claim 1, said encoding step further comprising the sub-steps of:
    generating an image identifier for use in recovering said block of metadata from a database;
    adding at least a portion of said image identifier to said metadata block; and
    encoding said image identifier with said image data to produce said encoded image data.

4. The method according to claim 3, wherein said image identifier is steganographically encoded into said image data.

5. A method according to claim 3, wherein said image identifier comprises a flag indicating whether said encoded image data has augmented metadata associated therewith.

6. The method according to claim 1, wherein copyright information is included in said metadata block.

7. A detection method for detecting modification of an image comprising image data and associated metadata, wherein said image is marked according to the method of claim 1, said detection method comprising the steps of:
    accessing said second hash;
    determining a third hash for said augmented metadata block;
    comparing said third hash with said second hash; and
    determining modification of said augmented metadata block based on said comparison.

8. The detection method according to claim 7, said method comprising the further steps of:
    accessing said first hash;
    determining a fourth hash for said encoded image data;
    comparing said first hash with said fourth hash; and
    determining modification of said image data based on said comparison.

9. A method according to claim 7, wherein said second hash is accessed utilizing a public key.

10. A method according to claim 1, said method comprising the steps of:
encoding said second hash using a private encoding key; and
adding the encoded second hash to said augmented metadata block.

11. An apparatus for marking image data representing an image for use in modification detection, said apparatus comprising:
encoding means for encoding said image data to produce encoded image data;
first hashing means for hashing said encoded image data to provide a first hash;
adding said first hash to a block of metadata representing at least one parameter associated with acquisition of said image data, to form an augmented block of metadata;
second hashing means for hashing said augmented metadata block to provide a second hash;
adding said second hash to said augmented metadata block; and
association means for creating an association between said encoded image data, and said augmented metadata block, thereby marking said image.

12. A computer readable medium, having a program stored thereon, wherein the program is configured to make a computer execute a procedure to mark image data representing an image for use in modification detection, said program comprising:
code for encoding said image data to produce encoded image data;
code for hashing said encoded image data to provide a first hash;
code for adding said first hash to a block of metadata representing at least one parameter associated with acquisition of said image data, to form an augmented block of metadata;
code for hashing said augmented metadata block to provide a second hash;
adding said second hash to said augmented metadata block; and
code for creating an association between said encoded image data and said augmented metadata block, thereby marking said image.

13. A method of authenticating an image, wherein said image is marked according to the method of claim 1, said method comprising the steps of:
determining availability of said augmented metadata block;
determining if said augmented metadata block has been modified upon said augmented metadata block being available;
determining if said image data has been modified; and
authenticating said image in the event that neither said augmented metadata block nor said image data have been modified, wherein said augmented metadata block and said image data are independently authenticated.

14. A method according to claim 13, further comprising the step of determining if said image contains authentication metadata.

15. A method according to claim 14, further comprising the steps of:
accessing steganographically encoded data in said image data if said image does not contain authentication metadata;
utilising said steganographically encoded data to determine if said image once contained associated authentication metadata; and
recovering said associated authentication metadata using said steganographically encoded data.

16. A method according to claim 15, comprising the further step of utilising said recovered associated authentication metadata to determine if said image data has been modified.

17. A method according to claim 15, wherein said associated authentication metadata is recovered from an independent database.

18. A method according to claim 14, further comprising the steps of:
accessing said authentication metadata if said image contains authentication metadata;
determining whether an image identifier in said authentication metadata matches an image identifier in steganographically encoded data in said image data; and
authenticating said image in the event that the image identifiers match, otherwise recovering said associated authentication metadata using steganographically encoded data.

* * * * *

UNITED STATES PATENT AND TRADEMARK OFFICE
CERTIFICATE OF CORRECTION

| | | |
|---|---|---|
| PATENT NO. | : 7,251,343 B2 | |
| APPLICATION NO. | : 10/319713 | |
| DATED | : July 31, 2007 | |
| INVENTOR(S) | : Andrew James Dorrell et al. | |

It is certified that error appears in the above-identified patent and that said Letters Patent is hereby corrected as shown below:

TITLE PAGE, ITEM [56] REFERENCES CITED

Other Patent Documents
"A Robust Image Authentication Method Distinguishing JPEG Compression from Malicious Manipulation", Ching-Yung Lin et al., IEEE Trans. on Circuits and Systems For Video Technology, Feb. 2001, pp. 153-168." (first occurrence) should be deleted.

[57] ABSTRACT

Line 6, "metadata the" should read --metadata and the--.

COLUMN 8

Line 20, "fulfil" should read --fulfill--.
Line 33, "step" should read --sub-step 803,--.
Line 34, "sub-803," should be deleted.

COLUMN 11

Line 9, "210" should read --210.--.

UNITED STATES PATENT AND TRADEMARK OFFICE
CERTIFICATE OF CORRECTION

PATENT NO. : 7,251,343 B2
APPLICATION NO. : 10/319713
DATED : July 31, 2007
INVENTOR(S) : Andrew James Dorrell et al.

It is certified that error appears in the above-identified patent and that said Letters Patent is hereby corrected as shown below:

COLUMN 13

Line 32, "an" should read --a--.
Line 37, "9116" should read --916--.
Line 49, "IBM-PC's" should read --IBM PCs--.

Signed and Sealed this

Eighteenth Day of March, 2008

JON W. DUDAS
*Director of the United States Patent and Trademark Office*